United States Patent
Ehara

(10) Patent No.: US 6,577,881 B1
(45) Date of Patent: Jun. 10, 2003

(54) METHOD FOR AUTOMATICALLY PROCESSING SETTING OF PORTABLE TELEPHONE ADDITIONAL SERVICES AND PORTABLE TELEPHONE FITTED WITH AUTOMATIC RESPONSE FUNCTION

(75) Inventor: Tatsuji Ehara, Saitama (JP)

(73) Assignee: NEC Corporation, Tokyo (JP)

( * ) Notice: Subject to any disclaimer, the term of this patent is extended or adjusted under 35 U.S.C. 154(b) by 0 days.

(21) Appl. No.: 09/437,744

(22) Filed: Nov. 10, 1999

(30) Foreign Application Priority Data

Nov. 11, 1998 (JP) .......................... 10-320236

(51) Int. Cl.[7] .................... H04B 1/38; H04M 1/00; H04M 1/64
(52) U.S. Cl. .................. 455/563; 379/88.02; 379/88.01
(58) Field of Search ..................... 379/88.02, 88.01, 379/88.11, 201.01, 201.02, 201.03, 201.04, 201.05, 201.06, 201.07, 201.08, 201.12, 204.01, 207.02; 455/414, 418, 419, 550, 90, 575, 557, 563; 704/246, 247, 270.1, 275

(56) References Cited

U.S. PATENT DOCUMENTS

| | | | | |
|---|---|---|---|---|
| 5,742,910 A | * | 4/1998 | Gallant et al. | 455/550 |
| 6,128,482 A | * | 10/2000 | Nixon et al. | 455/414 |
| 6,173,193 B1 | * | 1/2001 | Bright | 455/563 |
| 6,339,706 B1 | * | 1/2002 | Tillgren et al. | 455/419 |
| 6,374,125 B1 | * | 4/2002 | Toba | 455/563 |

* cited by examiner

Primary Examiner—Rexford Barnie
(74) Attorney, Agent, or Firm—Young & Thompson

(57) ABSTRACT

There is provided a portable telephone fitted with an automatic response function and having a function of judging a speech guidance received from a service center by using a such recognition process to automatically respond to the speech guidance and to set and register intended information to the service center in setting the additional service from the portable telephone to the service center.

21 Claims, 3 Drawing Sheets

METHOD FOR AUTOMATICALLY PROCESSING SETTING OF PORTABLE TELEPHONE ADDITIONAL SERVICES AND PORTABLE TELEPHONE FITTED WITH AUTOMATIC RESPONSE FUNCTION

BACKGROUND OF THE INVENTION

The present invention relates to a system for automatically processing setting of portable telephone additional services, and to a portable telephone fitted with an automatic response function, for storing information and setting portable telephone additional services in accordance to speech guidance from a service center given when a user calls the service center dedicated for portable telephones through the portable telephone.

DESCRIPTION OF THE RELATED ART

Traditionally, there have been portable telephone additional services as services of portable telephones. Information might be stored and the additional service of the portable telephone might been set by calling to the service center dedicated for portable telephones from the portable telephone and by manipulating the portable telephone in accordance to speech guidance given from the service center. In concrete, there has been a character message service for sending a character message to a specified person similarly to a pager.

In the character message service, the user registers a telephone number of a receiver and a character message to a character message center via the portable telephone or a fixed telephone. Next, the character message center transmits the registered character message to the telephone number of the receiver.

This character message service allows information to be transmitted even when communication is impossible like when the receiver stays at the place where radio cannot reach or the power is not turned on when the portable telephone of the receiver is put into the state in which it can receive calls.

The user has registered and set intended information in the service center by calling the character message center and by repeatedly manipulating the portable telephone in accordance to the speech guidance of the character message center given by listening thereto in the character message service of the past.

Thus, the user had to manipulate the portable telephone in accordance to the speech guidance of the service center in the character message service of this type in particular in the past. However, it is difficult to correctly listen to the speech guidance of the service center in the state in which the ambient noise is large such as a train. Still more, there has been a problem that the key manipulation has been cumbersome to make in accordance to the speech guidance.

SUMMARY OF THE INVENTION

It is an object of the invention to solve the above-mentioned problems by providing a method for automatically processing setting of portable telephone additional services and a portable telephone fitted with an automatic response function which allow the manipulation for registering and setting information to a service center to be simplified and the portable telephone additional service to be given without listening to any speech guidance.

The following processes are implemented in an inventive method for automatically processing setting of portable telephone additional services. Audio signal data transmitted from a service center is compared with and discriminated from audio signal data for speech recognition stored in advance in a memory as the first processing step. Then, it is discriminated whether or not the audio signal data is a request signal for setting a portable telephone additional service from the service center on the basis of the result of the comparing and discriminating process. Finally, when the audio signal data is the request signal for setting the portable telephone additional service, a process for transmitting information to the service center and a terminating process are automatically implemented.

An inventive portable telephone fitted with an automatic response function comprises a control unit and a speech recognizing unit. The speech recognizing unit compares audio signal data transmitted from a service center with audio signal data for speech recognition stored in advance in a memory to discriminate the identity of the both data. Then, the control unit discriminates whether or not the audio signal data is a request signal for setting a portable telephone additional service from the service center on the basis of the result of the comparing and discriminating process and when the audio signal data is the request signal for setting the portable telephone additional service, it automatically implements a process for transmitting information to the service center and a terminating process.

The specific nature of the invention, as well as other objects, uses and advantages thereof, will clearly appear from the following description and from the accompanying drawings in which like numerals refer to like parts.

DESCRIPTION OF THE PREFERRED EMBODIMENTS

Figure 1:
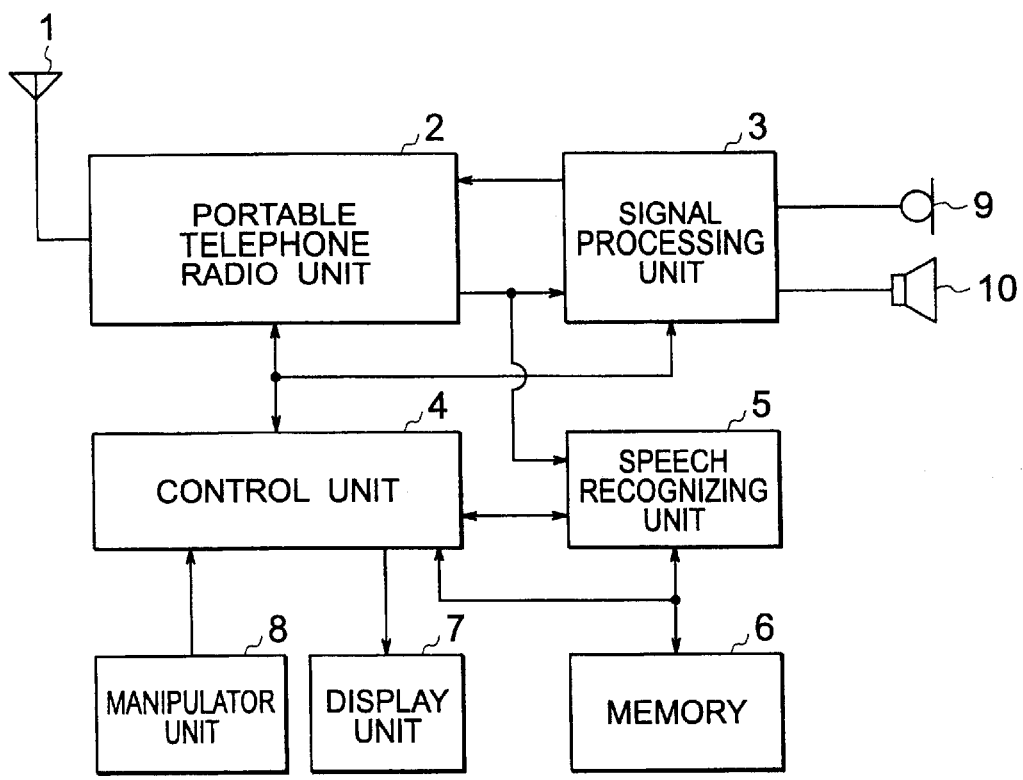
FIG. 1 is a block diagram showing one embodiment of an inventive portable telephone fitted with an automatic response function.
Figure 2:
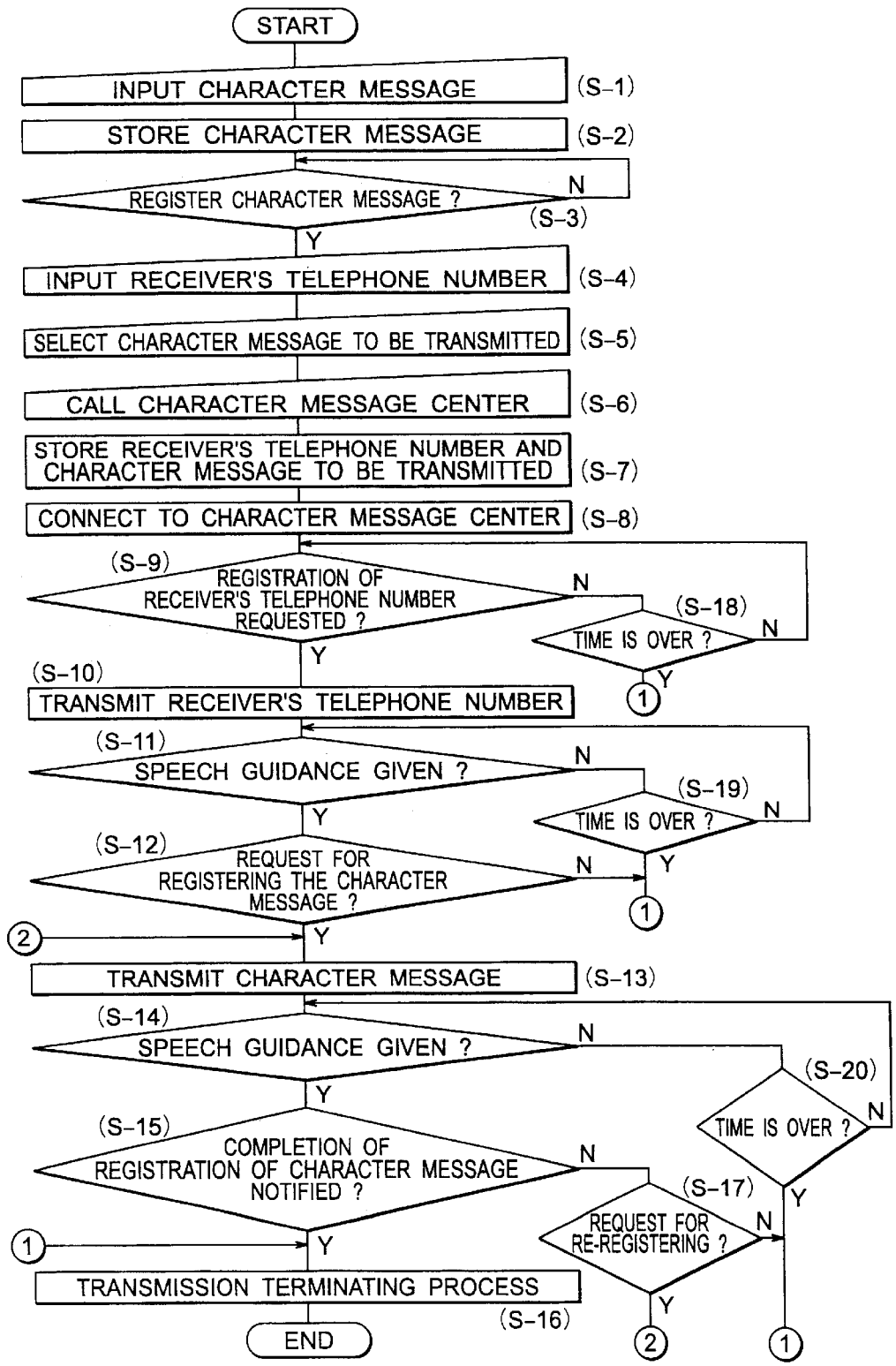
FIG. 2 is a flowchart showing the operation of an inventive method for automatically processing setting of portable telephone additional services.

One embodiment of the invention will be explained below with reference to FIGS. 1 and 2. FIG. 1 is a block diagram showing one embodiment of the invention. An inventive portable telephone comprises an antenna 1, a portable telephone radio unit 2, a signal processing unit 3, a control unit 4, a speech recognizing unit 5, a memory 6, a display unit 7, a manipulator unit 8, a microphone 9 and a receiver 10.

The portable telephone radio unit 2 comprises a transmitting circuit, a modulating circuit, a receiving circuit and a demodulating circuit. The portable telephone receives a signal from a base station not shown via the antenna 1. The radio unit 2 demodulates the received signal and sends the demodulated signal to the signal processing unit 3, the speech recognizing unit 5 and the control unit 4. The radio unit 2 also modulates a digital signal from the signal processing unit 3 and transmits the modulated signal via the antenna 1. The signal processing unit 3 converts speech inputted via the microphone 9 from analog to digital and sends it to the portable telephone radio unit 2, Meanwhile, the signal processing unit 3 converts the digital signal transmitted from the portable telephone radio unit 2 from digital to analog to be outputted from the receiver 10, The memory 6 is composed of a RAM and a ROM. The RAM stores information such as character messages to be sent and telephone numbers of its receiver. The ROM stores fixed audio signal data for speech recognition and audio data tables for comparing and discriminating speech guidance. The user can input the information stored in the RAM such as the character messages to be sent and the telephone numbers of the receivers and store them in the memory 6 by manipulating the manipulator unit 8 in accordance to a guidance displayed on the display unit 7.

The control unit 4 has a CPU. The control unit 4 controls the designation of a channel of the radio unit 2, carrier on/off, monitoring and others of a receiving electric field, processing of data with a base station not shown, the signal processing unit 3, the speech recognizing unit 5, processing of the result of speech recognition received from the speech recognizing unit 5, writing/reading information to/from the memory 6, display of the display unit 7 and a process for detecting manipulation of the manipulator unit 8. The speech recognizing unit 5 extracts audio data from a digital signal transmitted from the portable telephone radio unit 2 under the control of the control unit 4 and compares with audio signal data for speech recognition stored in the memory 6 to discriminate the type of the received audio data. The result of discrimination is notified to the control unit 4. Then, the control unit 4 judges the type of the audio data from the result of processing of speech recognition of the speech recognizing unit 5. The control unit 4 transmits the character message stored within the memory 6 and data of the telephone number of the receiver of the character message to the base station not shown via the portable telephone radio unit 2 as necessary.

As one mode of the portable telephone additional services, there is an additional service by which information may be stored or the additional service of the portable telephone may be set by calling the service center from the portable telephone to the service center dedicated for portable telephones and by manipulating the portable telephone in accordance to the speech guidance given from the service center. A typical one is a character message service of handling character messages axillary to a pager. The operation of the portable telephone constructed as described above or its operation in using the character message service in particular will be explained below concretely.

Prior to the connection to the character message center, the user stores a character message to be transmitted in the memory 6 within the portable telephone. The user inputs the character message to be transmitted by manipulating keys of the manipulator unit 8 to input Kana characters (Processing Step (S-1)). Then, the control unit 4 stores the inputted character message to be transmitted in the memory 6 in connection with its registration number. The control unit 4 correlates and manages the character message to be transmitted with the registration number in storing them in the memory 6 in order to be able to register a plurality of character messages to be transmitted (Processing Step (S-2)).

The control unit 4 monitors the manipulator unit 8 to detect the manipulation made by the user for transmitting the character message (Processing Step (S-3)). When the control unit 4 detects the manipulation for transmitting the character message, it displays a message urging to input a telephone number of the receiver on the display unit 7. Then, the user inputs the telephone number of the receiver to which the character message is to be transmitted by the manipulator unit 8 (Processing Step (S-4)). When the control unit 4 detects the telephone number of the receiver which has been inputted by the user, it displays the plurality of character messages to be transmitted and the registration numbers stored in the memory 6 on the display unit 7 and displays a message urging to select a registration number of the character message to be used in the transmission of this time among the registration numbers of the plurality of transmitting character messages. Then, the user selects the registration number of the character message to be transmitted and inputs it by the manipulator unit 8 (Processing Step (S-5)).

When the control unit 4 detects that the registration number of the character message to be transmitted has been inputted by the user, it displays a telephone number of the character message center and a message urging to press start key necessary for making the call. Then, the user presses start key to make a call to the character message center (Processing Step (S-6)). The control unit 4 stores the telephone number of the receiver inputted in Processing Step (S-4), the registration number of the character message to be transmitted inputted in Processing Step (S-5) and the character message to be transmitted correlated with the registration number in the memory 6 (Processing Step (S-7)) and controls the portable telephone radio unit 2 to connect to the character message center (Processing Step (S-8)).

After completing the connection to the character message center, the control unit 4 monitors a signal tone urging to transmit the telephone number of the receiver from the character message center. After processing in Processing Step (S-5), the control unit 4 controls the speech recognizing unit 5 to start the speech recognition process and sets a time-out timer.

The speech recognizing unit 5 takes in the digital signal received via the portable telephone radio unit 2 and compares the audio signal data, i.e., the digital signal, with the audio signal data for speech recognition stored in the memory 6 to discriminate the type of the audio data. It then stores the result of processing in the memory 6 and notifies it to the control unit 3. Receiving the notification of the speech recognizing unit 5, the control unit 4 reads the speech recognition processing result stored in the memory 6 to judge the type of the audio data transmitted from the character message center. The control unit 4 carries out this process repeatedly in unit of a certain time and when it detects the signal tone urging to send the telephone number of the receiver, it automatically advances to a process for transmitting the telephone number of the receiver (Processing Step (S-9)).

The control unit 4 carries out the discriminating process of Processing Step (S-9) until the time is over. When the time of the discriminating process is over, the control unit 4 causes the display unit 7 to display a message to the effect that there has been no response from the service center and that along that, a transmission terminating process will be implemented and advances to the transmission terminating process (Processing Step (S-18)). When the signal tone urging to send the telephone number of the receiver is detected in Processing Step (S-9)), the control unit 4 causes the display unit 7 to display a message to the effect that the telephone number of the receiver is being sent, reads the telephone number of the receiver stored in Processing Step (S-7) from the memory 6 and transmits the information on the telephone number to the character message center via the portable telephone radio unit 2 (Processing Step (S-10).

After transmitting the information on the telephone number in Processing Step (S-10), the control unit 4 controls the speech recognizing unit 5 to start the speech recognition process and sets the time-out timer. Then, the control unit 4 monitors whether or not a speech guidance is sent from the character message center in Processing Step (S-11) and when it detects the speech guidance, it advances to a process for judging the contents of the speech guidance in Processing Step (S-12). The control unit 4 implements the judging process in Processing Step (S-11) until when the time is over. When the time is over, the control unit 4 causes the display unit 7 to display a message to the effect that there has been no response from the service center after transmitting the telephone number of the receiver and that along that, the transmission terminating process will be implemented and advances to the transmission terminating process in Processing Step (S-19).

Receiving the telephone number of the receiver, the character message center judges whether or not the received telephone number is that of a subscriber of the character message service. When the telephone number of the receiver is a subscriber of the character message service, the character message center transmits a specific speech guidance urging to register the character message to the portable telephone and when it is not a subscriber, the character message center transmits a speech guidance to the effect that the character message service cannot be utilized.

The control unit 4 judges the contents of the speech guidance transmitted from the character message center (Processing Step (S-12)). It judges whether or not the speech guidance is a request guidance for registering the character message by comparing it with a audio data table of the speech guidance stored in the memory 6. When the control unit 4 detects the character message registering request data(request to transmit the character message), it advances to the character message transmitting process. When the control unit 4 cannot detect the character message registering request or detects a request other than the character message registering request, it displays an outline of the received speech guidance and a message to the effect that along that, the transmission terminating process will be implemented on the display unit 7 and advances to the transmission terminating process (S-12). When the control unit 4 detects the character message registering request from the character message center, it displays a message to the effect that the character message is being transmitted on the display unit 7 and reads the character message correlated with the registration nether stored in Processing Step (S-7) from the memory 6 to transmit to the character message center via the portable telephone radio unit 2 (Processing Step (S-13)).

After transmitting the character message in Processing Step (S-13), the control unit 4 controls the speech recognizing unit 5 to start the speech recognition process and sets the time-out timer. The control unit 4 monitors whether or not there is a speech guidance transmitted from the character message center and when it detects the speech guidance, it advances to the process for judging the contents of the speech guidance (Processing Step (S-14)). The judging process of Processing Step (S-14) to carried out until when the time is over. When the time is over without detecting any speech guidance, the control unit 4 causes the display unit 7 to display a message to the effect that the completion of the registration of the character message has not been notified and that along that, the transmission terminating process will be implemented and advances to the transmission terminating process (Processing Step (S-20)).

The control unit 4 judges the contents of the speech guidance sent from the character message center by the speech recognizing unit 5 (Processing Step (S-15)). It judges whether or not the speech guidance is the character message registration completion guidance by comparing it with the audio data table of the speech guidance stored in advance in the memory 6. When the control unit 4 detects the character message registration completion data, it displays a message to the effect that the registration of the character message has been completed on the display unit 7 and advances to the transmission terminating process (Processing Step (S-16)). When the control unit 4 detects a data other than the character message registration completion data in the judging process of Processing Step (S-15), it compares it with the audio data table of speech guidance stored in advance in the memory 6 to judge whether it is a request guidance for registering again the character message (Processing Step (S-17)). When it is the request guidance for registering again the character message (request guidance for re-registering the character message), the control unit 4 causes the display unit 7 to display a message to the effect that the character message is being sent again and advances to the process of Processing Step (S-13). When it is a guidance other than the request guidance for registering again the character message, it displays a message to the effect that the registration of the character message has been failed on the display unit 7 and advances to the transmission terminating process in Processing Step (S-16)). When the registration of the character message-is completed, the control unit 4 controls the portable telephone radio unit 2 to implement the transmission terminating process (Processing Step (S-16)). When a speech terminating request is transmitted from the character message center in the series of the processes, the control unit 4 implements the transmission terminating process and displays a message telling the reason of the termination and that the transmission terminating process will be implemented.

As described above, the present embodiment allows the action of listening to the speech guidance to be eliminated by judging the speech guidance received from the service center by using the speech recognition process and by automatically responding to it in utilizing such portable telephone service. Further, it allows the key operation to be implemented after receiving the speech guidance to be eliminated by judging the contents of the speech guidance by using the speech recognition process and by automatically responding in accordance to the speech guidance.

Thus, the invention allows the manipulation for sending the stored telephone number of the receiver, the manipulation for transmitting the stored character message and the manipulation for terminating the speech, which are to be implanted after Processing Steps (S-9), (S-12) and (S-15), to be eliminated from the conventional registering means in terms of the manipulations and the action of listening to the speech guidance to be eliminated.

It is noted that although the character message service has been described in particular among the portable telephone services in the embodiment described above, it is possible to accommodate with other portable telephone services as well. For instance, it is applicable to all additional services related to ones in which the portable telephone user must make some manipulation in response to a service setting request from a service center such as a bank balance inquiry service. The automatic response is also possible by using the speech recognition process.

Figure 3:
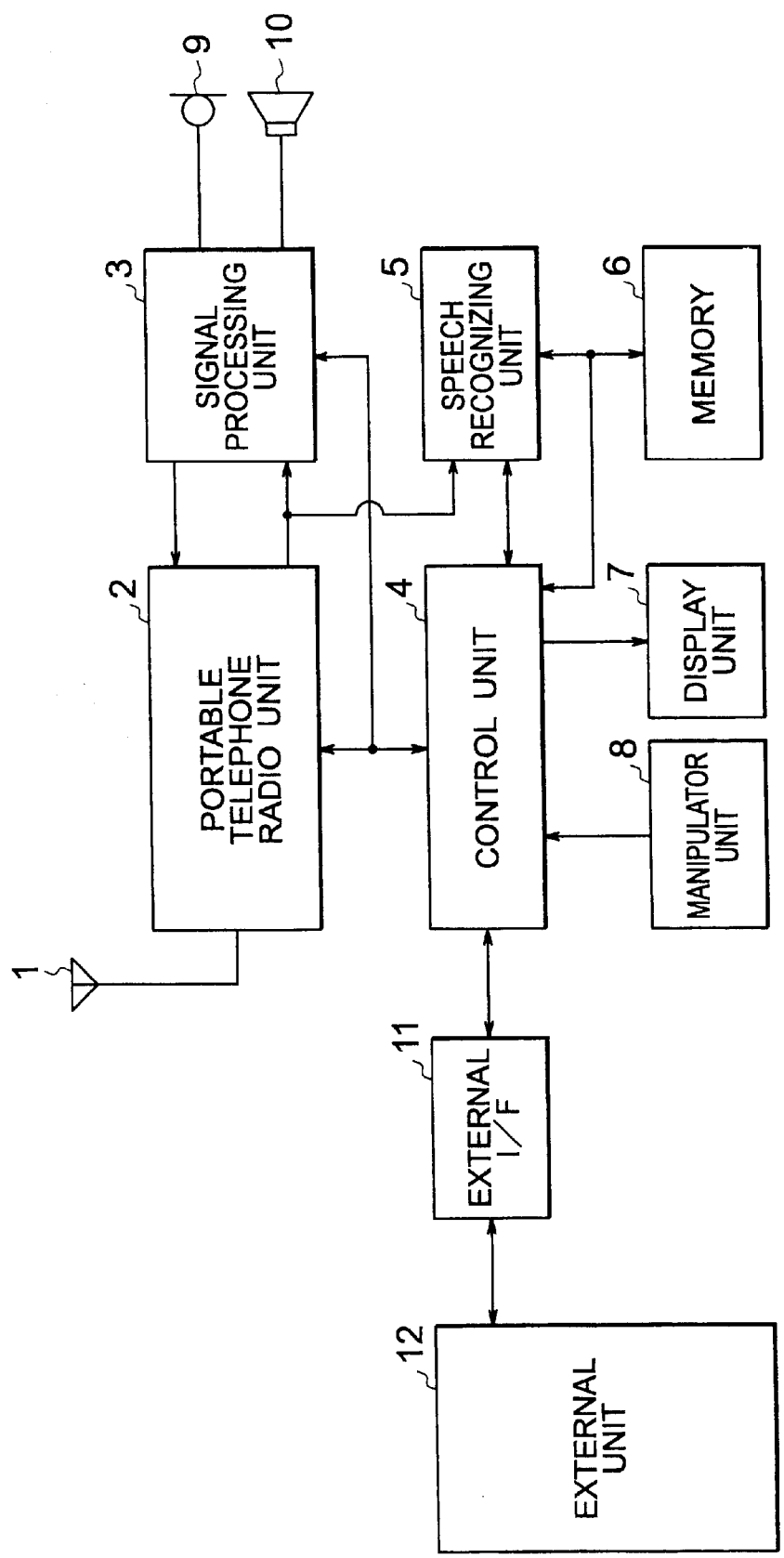
FIG. 3 is a block diagram showing another embodiment of the invention.

In case of connecting a portable telephone to an external unit to utilize a portable telephone service such as the character message service under the control of the external unit as shown in FIG. 3, the conventional registering means had to be arranged so as to control the external unit by listening to the speech guidance of the service center by human ears or so as to control unilaterally from the external unit at certain intervals while neglecting the speech guidance, However, the controls from the external unit on and after the control of calling to the service center may be eliminated by the invention by using the speech recognition in recognizing the contents of the speech guidance of the service center and by automatically responding to it. Therefore, the invention allows a number of accesses from the external unit to be reduced and its control to be simplified.

Thus, the invention allows intended information to be registered and set while eliminating the action of listening to the speech guidance of the service center and the cumbersome key operations by the function of judging the contents of the received speech guidance by utilizing the speech recognition, of automatically responding to the speech guidance and of registering the preset contents to the service center.

Further, the invention allows the user to grasp the exchange with the service center without listening to the speech guidance by the function of judging the contents of the received speech guidance by utilizing the speech recognition and of displaying the contents of operations based on the speech guidance on the display unit.

Still more, although the conventional registering means had to be arranged so as to control the external unit by listening to the speech guidance of the service center by human ears or so as to control unilaterally from the external unit at certain intervals while neglecting the speech guidance in connecting the portable telephone to the external unit to utilize the portable telephone service such as the character message service under the control of the external unit, the controls from the external unit on and after the control of calling to the service center may be eliminated by the invention by automatically responding to the guidance by using the speech recognition. Therefore, the invention allows a number of accesses from the external unit to be reduced and its control to be simplified.

While the preferred embodiments have been described, variations thereto will occur to those skilled in the art within the scope of the present inventive concepts which are delineated by the following claims.

What is claimed is:

1. A method for automatically processing the setting of portable telephone additional services to set a portable telephone additional service from a portable telephone to a service center, comprising:
   comparing and judging audio signal data transmitted from said service center with audio signal data for speech recognition stored in a memory in advance;
   judging whether or not said audio signal data is a request signal for setting a portable telephone additional service from said service center on the basis of the result of comparing and judging process; and
   automatically, starting a process for transmitting information to said service center and terminating a process for transmitting when said audio signal data is said request signal for setting the portable telephone additional service.

2. A portable telephone fitted with an automatic response function and having a function for setting a portable telephone additional service from the portable telephone to a service center, comprising:
   a speech recognizing unit for comparing audio signal data transmitted from said service center with audio signal data for speech recognition stored in a memory within said portable telephone in advance to judge the identity of the both data; and
   a control unit for judging whether or not said audio signal data is a request-signal for setting a portable telephone additional service from said service center on the basis of the result of the comparing and judging process, and for automatically starting a process for transmitting information to said service center, and for terminating a process for transmitting when said audio signal data is said request signal to set a portable telephone additional service.

3. A method as claimed in claim 1, wherein said portable telephone additional service is a character message service handling character messages.

4. The portable telephone fitted with an automatic response function as claimed in claim 2, wherein said portable telephone additional service is a character message service handling character messages.

5. The method as claimed in claim 3, further comprising:
   storing data of a character message to be transmitted and a telephone number of its receiver inputted to said memory by the user;
   connecting to said service center after said data are stored to said memory;
   monitoring registration requesting audio signal data requesting to register the telephone number of the receiver from said service center after completing the connection to said service center;
   comparing and judging both said transmitted telephone number and said stored telephone number, when said registration requesting audio signal data is detected;
   displaying automatically a message to the effect that the telephone num r of the receiver is being transmitted on a display unit within said portable telephone and reading said telephone number of the receiver from said memory to send to said service center, when said both data coincide;
   said service center judging whether or not the received telephone nether of the receiver is a telephone number of a subscriber of the character message service after the transmission of the telephone number of the receiver;
   said service center transmitting a specific audio signal data urging to register the character message to said portable telephone when said received telephone number of the receiver is a telephone number of a subscriber of said character message service;
   said service center transmitting specific audio signal data to the effect that the character message service cannot be utilized when the received telephone number of the receiver is not a telephone number of a subscriber of the character message service;
   after receiving the audio signal data urging to register said character message, comparing and judging both said audio signal data urging to register the character message transmitted from said service center and an audio signal data stored in advance in said memory;
   when said both data coincide, reading said character message automatically from said memory to transmit said character message to said service center and displaying a message to the effect that said character message is sent on said display unit;
   when said both data do not coincide, automatically terminating a process for transmitting, and displaying a message to the effect that the transmission terminating process will be carried out on said display unit;

judging whether or not said speech recognizing unit judging whether or not a receiving audio signal data from said service center is a notification of completion of the registration of said character message stored in advance in said memory;

when both a receiving audio signal data from said service center and a character message registration completion data stored in advance in said memory coincide, automatically displaying a message that the registration of the character message has been completed on said display unit and advancing to the transmission terminating process; and automatically, implementing the transmission terminating process, when they do not coincide.

6. The portable telephone as claimed in claim 4, wherein:

said control unit connects to said service center after a character message to be transmitted and a telephone number of a receiver are stored to said memory by a user, and said control unit monitors registration requesting audio signal data requesting to register the telephone number of the receiver from said service center after completing the connection to said service center;

said speech recognizing unit comparing and judging both said telephone number registration requesting audio signal data transmitted by said service center and said telephone number registration requesting audio signal data stored said by said portable telephone, when said registration requesting audio signal data is detected; and said control unit automatically displaying a message to the effect that the telephone number of the receiver is being transmitted on a display unit within said portable telephone and said control unit reading said telephone number of the receiver from said memory to send to said service center when said both data coincide;

after receiving said telephone number of the receiver, said service center judging whether or not the received telephone number of the receiver is a telephone number of a subscriber of the character message service and transmitting specific audio signal data urging to register the character message to said portable telephone when said received telephone number of the receiver is a telephone number of subscriber of said character message service;

said service center transmitting specific audio signal data to the effect that the character message service cannot be utilized when the received telephone number of the receiver is not a telephone number of subscriber of the character message service;

said speech recognizing unit comparing and judging both said audio signal data urging to register the character message transmitted from said service center and an audio signal data stored in advance in said memory;

said control unit reading said character message automatically from said memory to transmit to said service center and displays a message to the effect that said character message is sent on said display unit when said both data coincide;

automatically, terminating the speech and displaying a message to the effect that the transmission terminating process will be carried out on said display unit, when said both data do not coincide;

said speech recognizing unit judging whether or not a receiving audio signal data from said service center is a character message registration completion data stored in advance in said memory, and automatically displaying a message that the registration of the character message has been completed on said display unit and advancing to the transmission terminating process, when both a receiving audio signal data from said service center and a character message registration completion data stored in advance in said memory coincide, and automatically implementing the transmission terminating process when they do not coincide.

7. A method as claimed in claim 1, wherein:

said respective comparing and judging processes are implemented until when a time is over and comprise steps, when the time is over, of displaying a message to the effect that there has been no response from said service center and that a transmission terminating process will be implemented on a display unit within said portable telephone and of advancing to the transmission terminating process.

8. The method as claimed in claim 3, wherein:

said respective comparing and judging processes are implemented until when a time is over and comprise steps, when the time is over, of displaying a message to the effect that there has been no response from said service center and that a transmission terminating process will be implemented on a display unit within said portable telephone and of advancing to the transmission terminating process.

9. The method as claimed in claim 5, wherein:

said respective comparing and judging processes are implemented until when a time is over and comprise steps, when the time is over, of displaying a message to the effect that there has been no response from said service center and that a transmission terminating process will be implemented on a display unit within said portable telephone and of advancing to the transmission terminating process.

10. The portable telephone as claimed in claim 2, wherein:

said respective comparing and judging processes are implemented until when a time is over and comprise steps, when the time is over, of displaying a message to the effect that there has been no response from said service center and that a transmission terminating process will be implemented on a display unit within said portable telephone and of advancing to the transmission terminating process.

11. The portable telephone as claimed in claim 4, wherein:

said respective comparing and judging processes are implemented until when a time is over and comprise steps, when the time is over, of displaying a message to the effect that there has been no response from said service center and that a transmission terminating process will be implemented on a display unit within said portable telephone and of advancing to the transmission terminating process.

12. The portable telephone as claimed in claim 6, wherein:

said respective comparing and judging processes are implemented until when a time is over and comprise steps, when the time is over, of displaying a message to the effect that there has been no response from said service center and that a transmission terminating process will be implemented on a display unit within said portable telephone and of advancing to the transmission terminating process.

13. The method as claimed in claim 1, wherein:

a request signal for registering again is transmitted when said audio signal data does not coincide with said character message registration completion data in the judge thereof and the judging processes for said character message transmitting process and said character message registration completing process are implemented for a predetermined time.

14. The method as claimed in claim 3, wherein:

a request signal for registering again is transmitted when said audio signal data does not coincide with said character message registration completion data in the judge thereof and the judging processes for said character message transmitting process and said character message registration completing process are implemented for a predetermined time.

15. The method as claimed in claim 5, wherein:

a request signal for registering again is transmitted when said audio signal data does not coincide with said character message registration completion data in the judge thereof and the judging processes for said character message transmitting process and said character message registration completing process are implemented for a predetermined time.

16. The method as claimed in claim 7, wherein:

a request signal for registering again is transmitted when said audio signal data does not coincide with said character message registration completion data in the judge thereof and the judging processes for said character message transmitting process and said character message registration completing process are implemented for a predetermined time.

17. The portable telephone as claimed in claim 2, wherein:

a request signal fox registering again is transmitted when said audio signal data does not coincide with said character message registration completion data in the judge thereof and the judging processes for said character message transmitting process and said character message registration completing process are implemented for a predetermined time.

18. The portable telephone as claimed in claim 4, wherein;

a request signal for registering again is transmitted when said audio signal data does not coincide with said character message registration completion data in the judge thereof and the judging processes for said character message transmitting process and said character message registration completing process are implemented for a predetermined time.

19. The portable telephone as claimed in claim 6, wherein:

a request signal for registering again is transmitted when said audio signal data does not coincide with said character message registration completion data in the judge thereof and the judging processes for said character message transmitting process and said character message registration completing process are implemented for a predetermined time.

20. The portable telephone as claimed in claim 10, wherein:

a request signal for registering again is transmitted when said audio signal data does not coincide with said character message registration completion data in the judge thereof and the judging processes for said character message transmitting process and said character message registration completing process are implemented for a predetermined time.

21. A portable telephone fitted with an automatic response function and having a function for setting a portable telephone additional service from said portable telephone to a service center, comprising:

a speech recognizing unit for comparing audio signal data transmitted from said service center with audio signal data for speech recognition stored in advance in a memory within said portable telephone to judge the identity of said both data; and a control unit for judging whether or not said audio signal data Is a request signal for setting a portable telephone additional service from said service center on the basis of the result of the comparing and the judging processes and for implementing automatically a process for transmitting information to said service center and a terminating process to said service center when said audio signal data is said request signal for setting the portable telephone additional service;

said portable telephone additional service being set without manipulating an external unit connected to said portable telephone.

* * * * *